United States Patent [19]

Naudin et al.

[11] Patent Number: 5,119,693
[45] Date of Patent: Jun. 9, 1992

[54] DAMPED DOUBLE FLYWHEEL, IN PARTICULAR FOR AUTOMOTIVE VEHICLES

[75] Inventors: Jacky Naudin, Metz-Vallieres; Jacques Michon, Paris, both of France

[73] Assignee: Valeo, Paris, France

[21] Appl. No.: 674,218

[22] Filed: Mar. 25, 1991

[30] Foreign Application Priority Data

Mar. 26, 1990 [FR] France .............. 90 03823

[51] Int. Cl.⁵ .......................................... F16H 15/10
[52] U.S. Cl. ........................................ 74/574; 464/67; 464/68; 192/106.2
[58] Field of Search ............ 74/572, 574; 192/106.2; 464/24, 66, 67, 68

[56] References Cited

U.S. PATENT DOCUMENTS

| | | | |
|---|---|---|---|
| 4,788,884 | 12/1988 | Reik et al. | 74/574 |
| 4,813,295 | 3/1989 | Prexl et al. | 74/572 |
| 4,816,006 | 3/1989 | Friedmann | 74/574 X |
| 4,846,323 | 7/1989 | Fukushima | 74/574 X |
| 4,903,544 | 2/1990 | Naudin et al. | 74/574 |
| 4,904,225 | 2/1990 | Womer et al. | 74/574 X |
| 4,946,420 | 8/1990 | Jäckel | 74/574 X |
| 4,961,487 | 10/1990 | Langeneckert | 74/574 X |
| 4,989,710 | 2/1991 | Reik et al. | 74/574 X |
| 5,005,686 | 4/1991 | Reik et al. | 74/574 X |

FOREIGN PATENT DOCUMENTS

| | | |
|---|---|---|
| 0251849 | 1/1980 | France . |
| 2587074 | 3/1987 | France . |
| 2618199 | 1/1989 | France . |
| 2626336 | 7/1989 | France . |
| 2633683 | 1/1990 | France . |
| 2066416 | 7/1981 | United Kingdom ............ 464/67 |

Primary Examiner—Dirk Wright
Attorney, Agent, or Firm—Charles A. Brown

[57] ABSTRACT

A damped double flywheel comprises two coaxial inertia masses which are mounted for relative rotation, both against the action of a first series of springs and against the action of a viscous damping means. A damper wheel connects the viscous damping means with the first series of springs, and the latter couple the damper wheel with a first damping control means carried by the first mass. A second series of circumferentially acting springs, of greater stiffness than the first series of springs, couples the damper wheel to a second damping control means which is carried in rotation on the second mass.

8 Claims, 2 Drawing Sheets

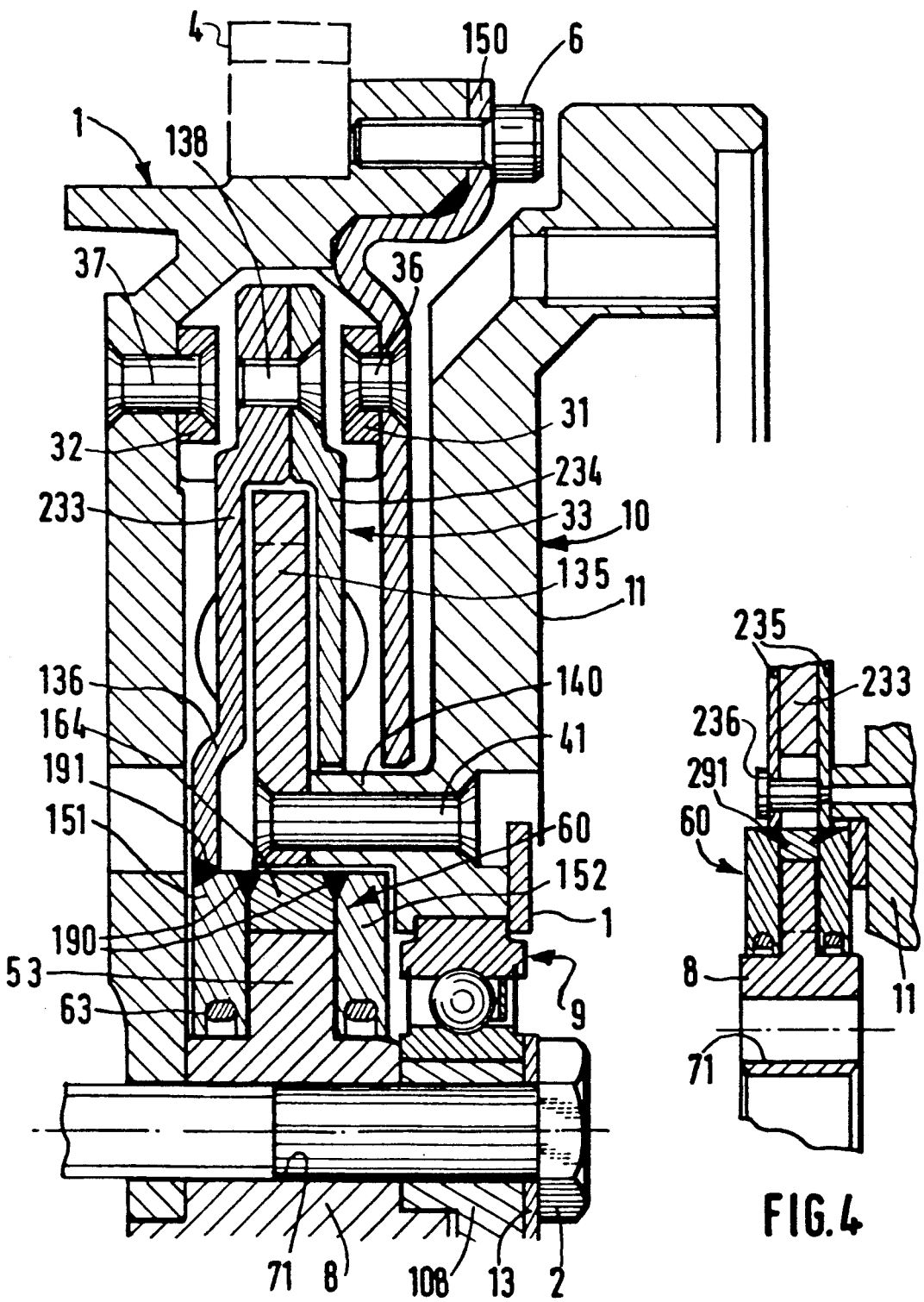

DAMPED DOUBLE FLYWHEEL, IN PARTICULAR FOR AUTOMOTIVE VEHICLES

FIELD OF THE INVENTION

This invention relates to double damped flywheels, in particular for automotive vehicles, being of the kind comprising two coaxial inertia masses which are mounted for relative rotation with respect to each other against the action of a series of circumferentially acting resilient means and against the action of a viscous damping means, which is provided for the purpose of braking the relative movement between the said masses.

BACKGROUND OF THE INVENTION

A double flywheel of the above kind is described in the specification of U.S. Pat. No. 4,903,544 and the corresponding French published patent application No. FR 2 626 336A. In those documents, the viscous damping means is arranged radially inward of the resilient means, being mechanically coupled between the two masses. The viscous damping means includes a sealed cavity which is at least partially filled with a fluid, and is mounted axially on a first one of the two said masses. This viscous damping means is of dimensions which are chosen to suit the application to which the flywheel is to be put, in order to obtain a predetermined degree of damping.

The viscous damping means also includes two closure members or cover members which are fixed to a spacer member, with these three members together defining the cavity of the damping means. The closure members are joined to each other, and are fixed, at least in rotation and optionally with a clearance, to a damper plate or damping wheel. The latter is arranged to come into engagement with the series of resilient means already mentioned, the latter being operatively interposed between the two masses. The double flywheel includes a first part (which will be referred to as a first damping control means), which is mounted in rotation on the first mass, and which is coupled by the said series of resilient means to the damper wheel. That series of resilient means is mounted in effective engagement with a radial abutment surface which is in a fixed position with respect to the first mass.

It follows that the said resilient means have an effective stiffness which varies under the action of centrifugal force, so that when the engine of the vehicle is running at high speeds, they function imperfectly, and may even become jammed against the radial abutment surface. This is detrimental to the performance of the double flywheel, and also to good absorption of vibrations, so that satisfactory damping is thus not obtained.

In addition, the viscous damping means, which serves its purpose during starting and stopping of the engine, continues to have effect at high engine speeds, to the detriment of good damping.

DISCUSSION OF THE INVENTION

An object of the present invention is to overcome the above drawbacks, and thus to provide a damped double flywheel which is effective at high engine speeds, while at the same time being adapted to reduce the effects of the viscous damping means at high engine speeds, and also having other advantages.

According to the invention, a damped double flywheel, comprising two coaxial inertia masses which are mounted for rotation with respect to each other against the action of, firstly, a first series of circumferentially acting resilient means, and secondly, for braking of the relative angular displacement between the said two masses, a viscous damping means comprising a sealed cavity in which a damper wheel is mechanically interposed between the viscous damping means and the said first series of resilient means, and wherein the said first series of resilient means couples a first damping control means, mounted on a first one of the said masses, to the said damper wheel, is characterised in that a second series of circumferentially acting resilient means, of greater stiffness than the said first series of resilient means, couples the damper wheel to a second damping control means which is mounted on the second mass for rotation with the latter, whereby the viscous damping means is coupled mechanically between the first mass and the damper wheel, the latter being an auxiliary intermediate damper wheel, and is adapted to operate in place of the said first damping control means.

The second series of resilient means constitute an auxiliary resilient means, such that when the first series misfunctions, or even becomes jammed, good damping is still obtained. This is because the second series of resilient means will then act between the damper wheel (which is then fixed with respect to the first mass) and the second damping control means. The second series of resilient means generally acts only at the end of the relative angular displacement movement between the two masses.

In addition, the viscous damping means no longer has any effect when the second series of resilient means are operating effectively, i.e. by themselves, in increasing the relative angular displacement between the two masses.

As a result of this arrangement, good damping is still obtained on stopping and starting of the vehicle, without there being any need to increase the size (in particular circumferentially) of the viscous damping means. The latter hardly operates at all in the last part of a relative angular displacing movement between the two masses.

Preferably, it is possible to make the double flywheel compact by joining the closure members of the viscous damping means to its spacer member by welding. This enables the radial size of the spacer member to be reduced, and thus enables the second series of resilient means to be easily accommodated within the same radius, while also providing coupling between the second flywheel part and the second mass, radially in the region of the outer periphery of the viscous damping means, in order to reduce the axial size of the double flywheel.

The damper wheel is preferably divided into two damper plates, which are spaced apart axially at their inner periphery but joined together at their outer periphery, so as to define radial arms which are arranged to intercept the first series of resilient means.

It is thus possible to maximise the number of conventional components of the double flywheel, while also, incidentally, being able to lubricate the first series of resilient means if required.

The description of preferred embodiments of the invention which follows, illustrates the invention in greater detail, with reference to the accompanying drawings.

BRIEF DESCRIPTION OF THE DRAWINGS

FIG. 3 is a half view, similar to FIG. 2 but showing a second embodiment of the invention.

FIG. 4 is a partial half view, seen in cross section, of the viscous damping means in a third embodiment.

DESCRIPTION OF PREFERRED EMBODIMENTS OF THE INVENTION

Figure 1:
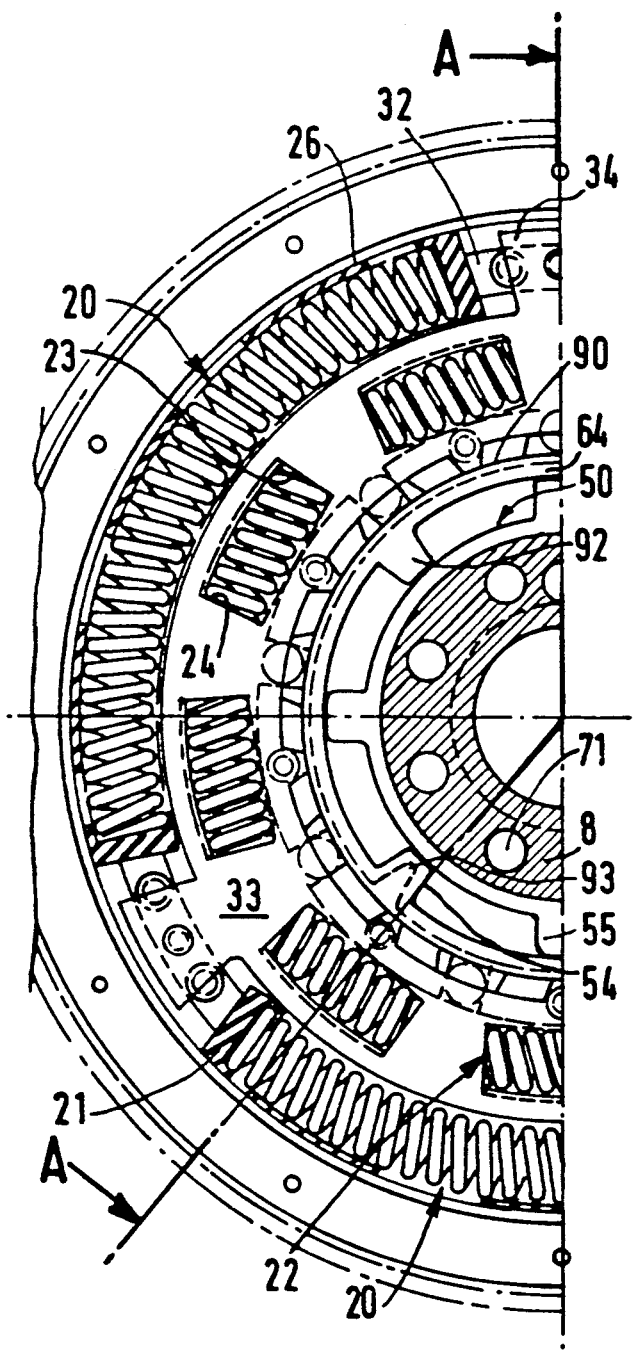
FIG. 1 is a partial half view in front elevation, showing a double flywheel showing the interior of the cavities comprised in it.

The damped double flywheel for an automotive vehicle which is shown in the drawings comprises two coaxial inertia masses 1 and 10, which are mounted for relative rotation with respect to each other, against the action both of circumferentially acting resilient means 20, 22 and of a viscous damping device 60. In this description, the mass 1 will be referred to as the first mass, and the mass 10 will be referred to as the second mass.

The first mass 1 comprises a hollow, annular housing 3, which is closed by a cover plate 5 and by a central hub comprising two members 8 and 108. These components are all secured to the nose of the crankshaft of the internal combustion engine of the vehicle, by means of a plurality of bolts 2 which pass through holes 71 formed in the hub 8, 108 and in the housing 3. The first mass 1 thus constitutes an input inertia mass. The housing 3 is secured through its base to the hub member 8, by means of screws 61, and carries a starting crown 4 on its axially oriented outer peripheral flange 15. The cover plate 5, which is generally annular in shape, is secured by means of further screws 6 to the housing flange 15.

Guide rings 31 and 32 are mounted on the mass 1 for rotation with it. In this example these guide rings are in the form of a plurality of blocks or pads; they are fastened in a sealing manner by riveting them to the mass 1. Here, the blocks 32 are secured by means of rivets 37 to the base of the housing 3, while the blocks 31 are secured by rivets 36 to the cover plate 5.

An intermediate damper wheel 33 is disposed axially between the guide rings 31 and 32, and is coupled in rotation to the second mass 10, in a manner which will be described below. The damper wheel 33 has radial arms 34 which project radially outwards (see FIG. 1) so as to intercept and bear on a first series of circumferentially acting resilient means 20. In this example, these consist of coil springs 20 which are operatively interposed between the two masses 1 and 10. The springs 20 are mounted close to the housing flange 15. The damper wheel 33 is mechanically interposed between the springs 20 and the viscous damping device 60, while the guide rings 31 and 32 constitute a first damping control means of the double flywheel, being mounted on the first mass 1 for rotation with it.

The circumferential length of the springs 20 is substantial, as is shown in FIG. 1. Each spring 20 is mounted, through intermediate end inserts 21, between two consecutive blocks 32, and two consecutive blocks 31, of the respective guide rings, the blocks 31 and 32 being disposed facing each other. The inserts 21 are such as to intercept the radial arms 34: in the rest position of the assembly, there may optionally be a clearance between the radial arms 34 and the end inserts 21.

A second series of circumferentially acting resilient means 22 couples the intermediate damping wheel 33 to a second damping control means 35 of the double flywheel. The stiffness of each of the members of the resilient means 22 is greater than that of each of the springs 20 in the first series of resilient means. The second resilient means 22 is mounted on the second mass 10 for rotation with the latter, in such a way that the viscous damping means 60 is mechanically interposed between the first mass 1 and the intermediate damper wheel 33, so that it may operate in substitution for the first damping control means 31, 32. In this example, the second series of circumferentially acting resilient means 22 consist of a second series of coil springs, while the damper wheel 32 comprises two damper plates 133 and 134, which are joined together at their outer periphery by means of a plurality of rivets 38 so as to constitute the radial arms 34.

The damper plates 133 and 134 are so shaped as to define, radially inward of the rivets 38, a radial cavity in which the second damping control means 35, mentioned above, is housed. The latter, which functions as an output damping control means, is in the form of a ring 35. Thus, the damper plates 133 and 134 have, at their inner periphery, portions which are offset axially from each other, while they are brought together and secured at their outer periphery.

The ring 35 is formed with windows 24, disposed in line with further windows 23 of the damper plates 133 and 134. The second series of coil springs 22 are mounted in the windows 23 and 24, being disposed on a common second pitch circle of smaller radius than the first pitch circle on which the springs 20 lie. The springs 22 (see FIG. 1) are shorter circumferentially than the springs 20, and the latter are provided with friction pads 26, each fitted over a series of turns of the corresponding spring 20, so as to reduce fretting between the springs 20 and the flange 15 of the housing 3, against which the springs 20 bear radially.

In this example, there are four of the springs 20 and eight of the springs 22, with the former being mounted radially outwardly of the damper wheel 33 and between the radial arms 34 of the latter, and also radially outwardly of the ring 35. It should be noted that in a variant the inner periphery of the housing flange 15 may be given suitable hardening treatment so as to enable the friction pads 26 to be omitted.

The second mass 10 comprises an annular plate 11, which is the reaction plate of a clutch. The clutch also has a friction disc (not shown), which is mounted for rotation on the input shaft of the gearbox of the vehicle, and with which the reaction plate 11 is arranged to come into contact. The mass 10 thus constitutes an output inertia mass.

Figure 2:
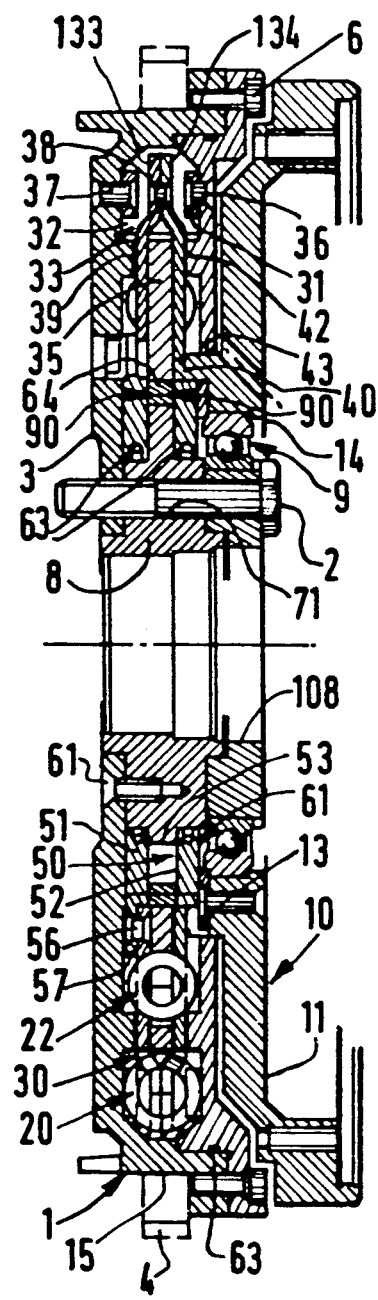
FIG. 2 is a view in axial cross section taken on the line A—A in FIG. 1.

A bearing 9 is interposed radially between the reaction plate 11 and the hub member 108, and is centred on the hub member 8. The bearing 9 may consist of an anti-friction bearing, or a rolling bearing as shown in FIGS. 1 and 2. It is located axially on the hub 8, 108 by means of shoulders formed on the hub members 8 and 108 respectively. Similarly, the bearing 9 is located axially on the reaction plate 11 by means of a shoulder 14 formed in the reaction plate 11 and a shoulder defined by a ring 13, which is secured by means of rivets to the reaction plate 11 adjacent to the viscous damping means 60.

The springs 20 are disposed within a first cavity 30 defined by the two masses 1 and 10 together. The cavity 30 is delimited mainly by the first mass 1, and in particular by its housing 3 and cover plate 5, and by annular axially oriented wall portions 39 and 42, which are arranged facing each other and which are carried respectively by the housing 3 and the cover plate 5. The cavity 30 is further delimited by the intermediate damper wheel 33, the radial arms 34 of which extend into the cavity 30.

The ring 35 extends radially from the outer periphery of the viscous damping means 60 up to the wall portions 39 and 42. It is thicker than the damper plates 133 and 134, and it will be noted that the latter are joined together radially outwardly of the wall portions 39 and 42, so as to enclose the ring 35 with inclined portions of the damper plates provided for this purpose.

The cavity 30 is filled (partially in this example) with a lubricating grease for the springs 20.

The viscous damping device 60, mechanically interposed between the mass 1 and intermediate damper wheel 33, defines a second sealed cavity 50, which is filled with a second fluid different from the first fluid with which the cavity 30 is filled. The cavity 50 is again delimited by the masses 1 and 10. This second cavity 50 lies radially inwardly of the first cavity 30 and radially inwardly of the springs 22. The cavities 30 and 50 are of course sealed by the provision of suitable sealing members, which are indicated in FIG. 2 at 63.

The viscous damping means, which it will be noted is fixed with respect to the damping wheel 33, is thus in the form of a cassette, disposed axially between the base of the housing 3 and the reaction plate 11. Its cavity, i.e. the second cavity 50, is delimited by two cover plates in the form of discs 51 and 52 or annular closure members, which are spaced apart axially from each other by means of an annular peripheral spacer 64.

Each closure member 51, 52 is secured to the spacer 64 by means of a continuous weld seam 90, such that the radial thickness of the spacer 64 is reduced without any associated reduction of the active part of the viscous damping means 60, and thus without affecting its performance. The closure members 51 and 52 are preferably welded to the spacer 64 using a laser welding process. In FIGS. 1 and 2, assembly of the members 51, 52 and 64 is effected by penetration welding through the full axial thickness, so that the weld extends across the closure plates 51 and 52.

The cavity 50 is also delimited by the hub, the member 8 of which carries a flange 53 which projects from it and which is interposed axially between the two closure members 51 and 52. This flange 53 constitutes an internal carrying element carrying radially oriented teeth 55, which extend into the cavity 50 away from the axis of the assembly, and which enable the viscous damping means 60 to be mounted axially on the first mass 1. The annular spacer 64 constitutes an internal carrying element, and carries at its inner periphery a further set of radially oriented teeth 54, opposed to the teeth 55. The teeth 54 alternate with the teeth 55 in the circumferential direction, and calibrated passages are defined, in particular, between the teeth 54, 55 and the members 51, 52, with consecutive teeth 54, 55 defining chambers between them.

In a variant, the teeth may be omitted, and in that case the flange 53 is in the form of a disc which is a loose fit between the closure members 51 and 52, defining narrow passages between the latter.

The cavity 50 is partially filled with a second fluid having a high viscosity, for example a silicone. As will be understood, the viscous damping means 60 is arranged to be effective in low speed modes, in particular on starting and stopping of the engine, when the mechanism passes through the resonant frequency below the slow running mode of the engine, so as to suppress vibration and to brake the relative angular displacement between the two masses 1 and 2.

In this example, the closure plate 1, adjacent to the base of the housing 3, carries at its outer periphery an annular flange 57 which is secured to the damper plate 133 by means of rivets 56. The other damper plate 134 is slotted to enable axial projections 40, which are fixed with respect to the reaction plate 11, to pass through it with a circumferential clearance. These axial projections 40 extend radially outward from the bearing 9 between the first cavity 30 and the second cavity 50. The ring 35 is mounted on the second mass 10 for rotation with it, by being appropriately shaped at the level of the projections 40 so as to mesh with the latter, optionally with a clearance.

The second mass 10 is mounted axially on the first mass 1, by means of the bearing 9 as described above.

The projections 40, which are of low thickness, project directly from the reaction plate 11 and constitute an axially oriented centring means for the viscous damping device 60. In this example the projections 40 are in the form of tenons alternating with mortices, as can be seen from FIG. 2, in such a way that the shape of the reaction plate in this region is that of an annular comb. The tenons and mortices are formed on the end of a cylindrical sleeve 43 extending through the internal bore of the cover plate 5, and are thus in the form of an arc of a circle. The ring 35, which is coupled to the reaction plate 11, optionally with a clearance, has slots complementary to the tenons 40 for cooperation with the latter.

The springs 22 are selected to have a stiffness which is higher than that of the springs 20. While relative angular displacement is taking place between the masses 1 and 10, the motion is transmitted through the guide rings 31, 32, the springs 20 and the damper wheel 33 with operation of the viscous damping means, and is then transmitted from the damper wheel 33 to the reaction plate 11 by means of the springs 22, the ring 35, and the axial projections 40. The springs 20 and 22 therefore act in series, with a low displacement in normal operation between the damper plate 33 and the ring 35. During angular displacement between the two masses 1 and 10, the fluid is subjected to shear, and fluid is transferred from one chamber (delimited by a tooth 54, 55) to the other chamber with consequent damping of the vibrations.

Thus if the springs 20 malfunction or become jammed, damping is still possible by means of the auxiliary springs 22 and the damper wheel 33, which thus operate in substitution for the first damping control means, without any action by the viscous damping means 60. When the vehicle is running, the springs 20 are blocked and therefore the damping means 60 has no effect.

In practice, the relative angular displacement between the damper plate 33 and the ring 35 is smaller than the relative angular displacement between the damper plate 33 and the first damping control means represented by the guide rings 31 and 32.

It will be appreciated that the auxiliary springs 22 allow the springs 20 to be released, and that the size of the viscous damping means 60 is able to be preserved in spite of the increase in relative angular displacement between the two masses 1 and 10.

As will be clear from this description, the arrangement of the viscous damping means 60, i.e. between the damper wheel 33 and the first mass 1, is better than if it were arranged between the ring 35 and the damper wheel 33. In this connection, the viscous damping means would not (in the latter case) be responsive to the applied forces in a satisfactory way during passage through the resonant frequency on stopping and starting of the engine, due to the small displacement between the damper wheel 33 and the ring 35. In addition, for large relative angular displacements between the two masses, it would in fact be a handicap, especially when the vehicle is running.

The inner periphery of the projections 40 cooperates with the outer periphery of the members 52 and 64 of the viscous damping means 60, for centring purposes. There is an axial clearance between the projections 40 and the base of the housing 3, with the projections terminating in front of the damper plate 133. Also, the cooperation between the cylindrical sleeve 43 and the internal bore of the cover plate 5 defines narrow passages. Thus the outer periphery of the sleeve 43 also has a sealing function, such that a seal need not be provided between the cover plate 5 and the sleeve 43. However, a seal in the form of a sealing member or, alternatively, a labyrinth may be provided if required.

In the present example, two weld seams 90 are provided, and as mentioned above welding is carried out by penetration welding over the whole axial thickness. Since each weld seam is associated with the spacer 64 and respectively with each of the closure plates 51 and 52, they are accordingly oriented axially and directed towards each other, to join together level with the spacer 64 and within the thickness of the latter. Each seam 90 has a triangular cross section.

The weld seams 90 extend through the members 51 and 52 without severing them, and may extend through the outer part of the spacer 64 as indicated at 90 in FIG. 1. In a variant, the seams may have a sinuous shape, and lie on the outer periphery of the spacer 64 and on the teeth 54 of the latter, as is indicated at 93 in FIG. 1. The seam 90 thus has a shape which is conformed with that of the toothed spacer 64.

In another variant, a seam weld 90 may be provided together with spot welds on the teeth 54, as indicated at 92 in FIG. 1.

Reference is now made to FIG. 3, in which the welding of the closure plates, 151 and 152, to the peripheral annular spacer is of the edge-to-edge type, with the welds seams, 190 in this Figure, being of triangular cross section as before and extending radially between the spacer, here denoted by the reference numeral 164, and each of the members 151 and 152. The damper plate, 233, is secured to the closure plate 151 by welding in a weld seam 191, which is again of triangular cross section but which is oriented axially.

In FIG. 3, the ring 135, corresponding to the ring 35 in FIG. 2, is mounted axially on the mass 10, with which it is rotatable. To this end, the damper plate 233 has on its inner periphery an axially offset portion 136 joined to the closure plate 151.

The damper plates 233 and 234 of the damper wheel 233 are joined together by means of screws 138, while the cover plate, here indicated by the reference numeral 150, is of pressed sheet steel. The ring 135 is secured by means of rivets 41 to an annular sleeve 140. As in FIGS. 1 and 2, the sleeve 140 extends through the internal bore of the cover plate 150 and of the damper plate 244. The sleeve 140 extends radially beyond the bearing 9 and serves for centring the spacer 164.

In the modified embodiment shown in FIG. 4, the damper plate 233 may itself constitute the spacer, with the weld seams, 291, being again of triangular cross section but in this case inclined with respect to each other and to the radial centre plane. In this case, the ring 35 (FIGS. 1 and 2) may be divided as shown in FIG. 4 into two identical rings 235 which are arranged axially on either side of the damper wheel 233, being joined together at a fixed axial spacing by means of spacers 236 which are secured on to the reaction plate 11 and which extend, with a clearance, through a slot formed in the damper wheel 233.

This slot, like that which is provided between the projections 40 and the damper plate 134, is designed to suit the required application, in such a way that a relative angular movement is possible between the reaction plate 11 and the damper wheel 233. Thus, the damper plate 233 directly engages the springs 20 through its radial arms 34.

It will be evident from this description and from the drawings that the overall axial length of the double flywheel is reduced, and that the various components may be mounted in the housing 3 by stacking, while the reaction plate may be fitted in position last. Similarly, the stiffness of the springs 22 depends on their pitch circle radius, in order to be able to release the springs 20 with complete reliability.

The present invention is of course not limited to the embodiments described above. In particular, the first mass 1 may be the output mass, and the second mass 10 the input mass. The inner support element (in FIG. 2 the flange 53) may be arranged with a clearance between it and the hub member 8, for example by means of splines.

In addition, the damper wheel 33 may be fixed with respect to the viscous damping means 60 only for rotation with it, and may be mounted on the latter by means of a mating fit.

The first cavity 30 is not indispensible, since the springs 20 and 22 may not be lubricated, and may be in the form of blocks of elastic material.

In the manner described in French published patent application No. FR 2 618 199A, the guide rings may be in the form of discs or wheels which are so shaped as to be joined together at the outside of the springs 20, so as to envelop the latter, with one of these rings being extended up to the housing flange 15 so as to be secured to the latter.

The springs 20 may be inserted radially inwardly of the springs 22, and in that case the guide rings 31 and 32 are reduced to a single disc which is disposed axially between the two auxiliary damper plates, and which is connected to the first mass by means of spacers which extend through one of the damper plates in a way similar to that described with reference to FIG. 3. In a further variant, it may be rotatably mounted as in FIG. 1. The ring 35 is then secured to the mass 10 through its outer periphery.

The first damping control means may simply comprise a single face plate, which may for example be secured to the housing flange 15, being interposed axially between the damper plates 133 and 134. The latter may be secured to each other by means of spacers which extend, with a clearance, through the ring 35 and which are located radially inward of the springs 20.

What is claimed is:

1. A damped double flywheel comprising: a first inertia mass; a second inertia mass; means mounting the said masses coaxially for relative rotation of one with respect to the other; a first series of circumferentially acting resilient means operatively disposed between the said masses for resisting the said relative movement; viscous damping means associated with the said masses for braking the relative angular displacement between the two said masses; a first damping control means; means mounting the said first damping control means on the said first mass for rotation with the latter; a second damping control means carried on the said second mass; and an auxiliary, intermediate damper wheel, the said viscous damping means defining a sealed cavity with the damper wheel extending into the said cavity, the damper wheel being mechanically interposed between the viscous damping means and the said first series of resilient means with the latter coupling the said first damping control means to the damper wheel, wherein the double flywheel further includes a second series of circumferentially acting resilient means, of greater stiffness than the resilient means of the said first series, with the said second series coupling the damper wheel to the said second damping control means, whereby the viscous damping means is mechanically coupled between the said first mass and the damper wheel so that it is able to perform the function of the first damping control means in substitution for it.

2. A double flywheel according to claim 1, wherein the damper wheel is provided with windows, the said second series of resilient means being mounted in said windows radially inward of the said first series of resilient means and radially outward of the viscous damping means.

3. A double flywheel according to claim 2, wherein the damper wheel comprises two damper plates having outer peripheral portions which are in mutual abutting engagement and which define radial arms of the damper wheel for intercepting the said first series of resilient means.

4. A double flywheel according to claim 3, wherein the damper plates comprise axially offset portions at their inner periphery, the damper plates further defining a space between them, the said damping control means comprising an input control means and an output control means, the said output control means being a ring mounted in the space defined between the said damper plates.

5. A double flywheel according to claim 4, wherein the viscous damping means comprises a pair of closure members and an annular, peripheral spacer member holding the said closure members in axial spacing from each other so as to define the said cavity, with one of the damper plates being secured to one of the said closure members.

6. A double flywheel according to claim 5, further comprising at least one continuous weld seam securing each said closure member to the spacer member, whereby to reduce the radial size of the spacer member.

7. A double flywheel according to claim 5, wherein the said second mass includes a reaction plate having axially oriented projections, the said ring constituting the output damping control means being mounted at least in rotation on the said projections.

8. A double flywheel according to claim 7, wherein the said projections constitute centring means for the viscous damping means.

* * * * *